(12) United States Patent
Zhang

(10) Patent No.: US 8,199,903 B2
(45) Date of Patent: Jun. 12, 2012

(54) SYSTEM AND METHOD OF REMOTE COMPUTER SERVICE

(75) Inventor: Xingming Zhang, Beijing (CN)

(73) Assignee: Star Softcomm Pte Ltd., Beijing (CN)

( * ) Notice: Subject to any disclaimer, the term of this patent is extended or adjusted under 35 U.S.C. 154(b) by 1020 days.

(21) Appl. No.: 11/914,528

(22) PCT Filed: Apr. 19, 2006

(86) PCT No.: PCT/CN2006/000725
§ 371 (c)(1),
(2), (4) Date: Jun. 13, 2008

(87) PCT Pub. No.: WO2006/122469
PCT Pub. Date: Nov. 23, 2006

(65) Prior Publication Data
US 2009/0262922 A1    Oct. 22, 2009

(30) Foreign Application Priority Data
May 17, 2005    (CN) .......................... 2005 1 0070615

(51) Int. Cl.
*H04M 3/00*    (2006.01)
(52) U.S. Cl. ......... 379/265.09; 379/265.01; 379/265.02; 379/265.04; 379/265.05; 379/265.06; 379/265.1; 379/265.11; 379/265.12; 379/265.13; 379/266.02
(58) Field of Classification Search .............. 379/265.09, 379/265.11, 266.03, 266.06, 71; 707/77.14, 707/7.21, 7.25
See application file for complete search history.

(56) References Cited

U.S. PATENT DOCUMENTS

| 6,668,056 | B2 * | 12/2003 | Rupe et al. ............... 379/266.03 |
| 2001/0012337 | A1 * | 8/2001 | Horie et al. ..................... 379/71 |
| 2002/0194047 | A1 * | 12/2002 | Edinger et al. .................... 705/9 |
| 2003/0086556 | A1 * | 5/2003 | Welch et al. ............. 379/265.09 |
| 2003/0105858 | A1 |  6/2003 | Hogg et al. |
| 2004/0221035 | A1 | 11/2004 | Morikawa |
| 2007/0019801 | A1 * | 1/2007 | Brenneman et al. ..... 379/265.11 |

FOREIGN PATENT DOCUMENTS

JP    2002-247036 A    8/2002

* cited by examiner

*Primary Examiner* — Joseph J Nguyen
(74) *Attorney, Agent, or Firm* — J.C. Patents

(57) ABSTRACT

A system of remote computer service including a call center, the Internet and a computer service supporting system. The computer service supporting system receives the requests from the computer and allocates and/or designates corresponding call center for the computer; the present invention also provides a method that the computer sends service request to the computer service supporting system by Internet; the computer service supporting system allocates and/or designates a call center for the computer and relates the computer and the call center by service ID; then, returns the communication means information and the service ID of the call center to the computer; the computer contacts with the call center by the communication means information, and the call center provides the service applied to the computer by using the service ID.

25 Claims, 8 Drawing Sheets

SYSTEM AND METHOD OF REMOTE COMPUTER SERVICE

TECHNICAL FIELD

The present invention relates to a system and a method of remote computer service, especially relates to a system and a corresponding processing method for providing real-time service to computer users adaptively and without geographical restrictions based on the Internet, which belongs to the technical field of computer application.

BACKGROUND OF THE INVENTION

Nowadays, the global computer industry is under rapid growing phase. As far as the computer manufacturers and sellers, with the gradually growing of the computer sales, the requirement of the supporting and maintenance facing the computer users grows proportionally. At the same time, with the application of computer operation system and the software gets complicated and professional increasingly, various viruses recklessly spread, and more and more computer users want to get more considerate and more comprehensive service of the computer supporting and repairing.

However, as far as the computer manufacturers and sellers, the expansion of the computer users' geographical coverage makes the service more difficult and makes the service cost continually get high. This has been a current existing problem which is difficult to overcome. For the professional IT service providers, it's impossible to really gain the expected benefits from the IT service, because of lacking of effective client remote supporting system.

Generally speaking, the computer manufacturers and sellers also including the professional IT service providers are now used for providing the call center of client supporting service for computer users. The application levels of the computer users and the occupational levels of the call center technical supporting staff are uneven, this results that the call center can not effectively solve the problem confronted by the computer users. The computer manufacturers and the IT service providers normally help users solve problems on the spot in the way of door-to-door service in order to ensure the satisfaction of clients. However, This method produces following problems:

1. Although the computer manufacturers and sellers provide call center phone supporting service, with the expansion of market and the growth of users, the phone supporting number of the call center grows, and the fee is quite considerable. At the same time, the application of the operating system and the software is increasingly complicated and professional, plus the spread of the virus, this leads to the amount of the supporting service needed by users also significantly increased. The problems confronted by users are getting more complicated and difficult for users to exactly describe, this leads to the growth of phone supporting time of the call center, even that the same problem can't be solved only by once phone. Finally, the problem is also solved by door-to-door service on the spot.

2. Because computer users' geographical coverage is getting increasingly widespread, users may be distributed nationwide or even global. Some users are located at remote areas, the possibility of door-to-door service is very small, and the cost is extremely high. This may bring the service providers with huge economic losses and at the same time lose the clients' satisfaction.

3. By providing door-to-door service to solve problems on the spot, although this can solve user computers' failure effectively, door-to-door service may not be in time even be delayed for several days sometimes because of the problem of users' coverage. During this term, maybe the computer user can't use computer, which brings users economic losses and directly leads to the drop of users' satisfaction.

Generally speaking, 80% of the computer failure is actually software-nature failure which can be solved by restoring system or reinstalling system. However, failure, which is similar to such software-nature failure, can completely be remotely solved by the Internet, and a set of effective Internet-based client supporting software system is only one absent.

SUMMARY OF THE INVENTION

The main object of the present invention is to provide a system and a method of remote computer service which can adaptively provide real-time maintenance and service supporting for the computer user based on the Internet.

The other object of the present invention is to provide a system and a method of remote computer service which can fully take advantage of the technical supporting ability of the call center by using the remote computer supporting ability of the Internet technique combing with call center to perfectly solve the problem in terms of computer maintenance supporting currently so as to prevent the computer user from being difficult to get timely supporting service because of the region restriction.

The other object of the present invention is to provide a system and a method of remote computer service, wherein the call center can rapidly diagnose the failure type and failure reason of a remote user computer by the Internet to avoid the drawbacks that the questions through the phone advisory are obscured and rapidly find out where the remote computer failure is so that it can send correct repair instructions and operation to the user computer through the network to remotely solve the computer failure, which greatly shorten the repair time and improve the repair efficiency.

The other object of the present invention is to provide a system and a method of remote computer service which can automatically find the most suitable call center for the computer user according to predefined or dynamical strategy to make the computer user get the most suitable service.

The objects of the present invention are accomplished as follows:

the present invention provides a system of remote computer service consisting of a call center and the Internet through which a computer is connected and interacted with the call center; said system of remote computer service further comprises a computer service supporting system, the computer service supporting system is connected and interacted with the computer and the call center respectively through the Internet, receives the service request of the computer, and allocates and/or designates corresponding call center for said computer;

a first agent module is set in said computer for logging in on the computer service supporting system through the Internet, communicating with the call center designated by the computer service supporting system, and sending needed information to the call center designated by said computer service supporting system, or acquiring the instructions or information from the call center designated by said computer service supporting system and completing the service for said computer;

a second agent module is set in said call center, according to the designating of said computer service supporting system, for communicating with the first agent module of said computer, receiving the information sent by the first agent module, or for sending instructions or information to the first agent module and completing the service for said computer.

The above said computer service supporting system at least consists of a communication server and a transmission server which are interconnected with each other; said communication server is used for receiving the service request sent by the first agent module of said computer, and allocating and/or designating a transmission server for interacting for the computer which applies for the service; said transmission server is used for receiving the instructions or information of said computer and transmitting them to said second agent module, and/or transmitting the instructions or information sent by said second agent module to said computer.

In order to provide more timely and effective service for the special user, said computer service supporting system further comprises a registration server; the registration server is connected to the communication server and stores said computer user information; and said communication server conducts identification to the computer which logs in on the computer service supporting system according to said user information and feeds the identification result back to said computer so that the preregistered user can get the most suitable service.

The above said registration server further stores the call center information; the communication server conducts identification to the call center which logs in on the computer service supporting system according to said call center information and feeds the identification result back to said call center.

Sometimes, the computer maintenance service needs calculating suitable fee or provides corresponding service according to the charging situation. Thus, the computer service supporting system further comprises a charging server, and the charging server is connected to the communication server for charging the computer user who accepts the service according to the service information transmitted by the communication server.

The above said first agent module is set in the BIOS and/or EFI of said computer or can be set in the operation system of said computer. Sometimes, said computer is provided with many operation systems, and said first agent module can be set in one or many operation systems. Certainly, the first agent module can also be stored in the peripheral device of the computer, and after the computer is started, it can be loaded into the memory. Finally, the first agent module can also be stored in the website of the Internet, and the computer can downloads said first agent module to local only by knowing the IP address of the website.

The present invention also provides a method of remote computer service comprising:

step 1: said computer logs in and sends a service request by the first agent module thereof to the computer service supporting system through the Internet;

step 2: after said computer service supporting system receives said service request, it allocates and/or designates a corresponding call center for said computer and relates said computer to said call center by a service ID, and then returns communication method information and the service ID of the call center which has been allocated and/or designated to said computer;

step 3: said computer gets in touch with the call center by the communication method information it got, and the call center authorizes the validity of the service applied by said computer using said service ID through the computer service supporting system;

step 4: said call center communicates with said computer by the second agent module thereof and using said service ID and provides the service applied by said computer.

After the above said steps 1-4, in order to accomplish charging for the service, the method of the present invention comprises step 5 that after said computer service supporting system completes the service for said computer, it charges for the corresponding service through the charging server thereof.

The system and method of the remote computer service provided in the present invention can adaptively provide real-time maintenance and service supporting for the computer client because it's based on the Internet. By taking advantage of the remote computer supporting ability of the Internet technique combing with call center, the technical supporting ability of the call center can be fully used, thus, this perfectly solved the problem in terms of computer maintenance supporting currently so as to prevent the computer user from being difficult to get timely supporting service because of the region restriction. Through the Internet, the call center can rapidly diagnose the failure type and failure reason of a remote user computer so as to avoid the drawbacks that the questions through the phone advisory are obscured and rapidly find out where the remote computer failure is. It can send correct repair instructions and operation to the user computer through the network to remotely solve the computer failure, which greatly shorten the repair time and improve the repair efficiency. The present invention can automatically find the most suitable call center for the computer user according to predefined or dynamical strategy to make the computer user get the most suitable service.

The present invention will be described in detail combining with following figures and embodiments.

DETAILED DESCRIPTION OF THE INVENTION

Figure 1A:
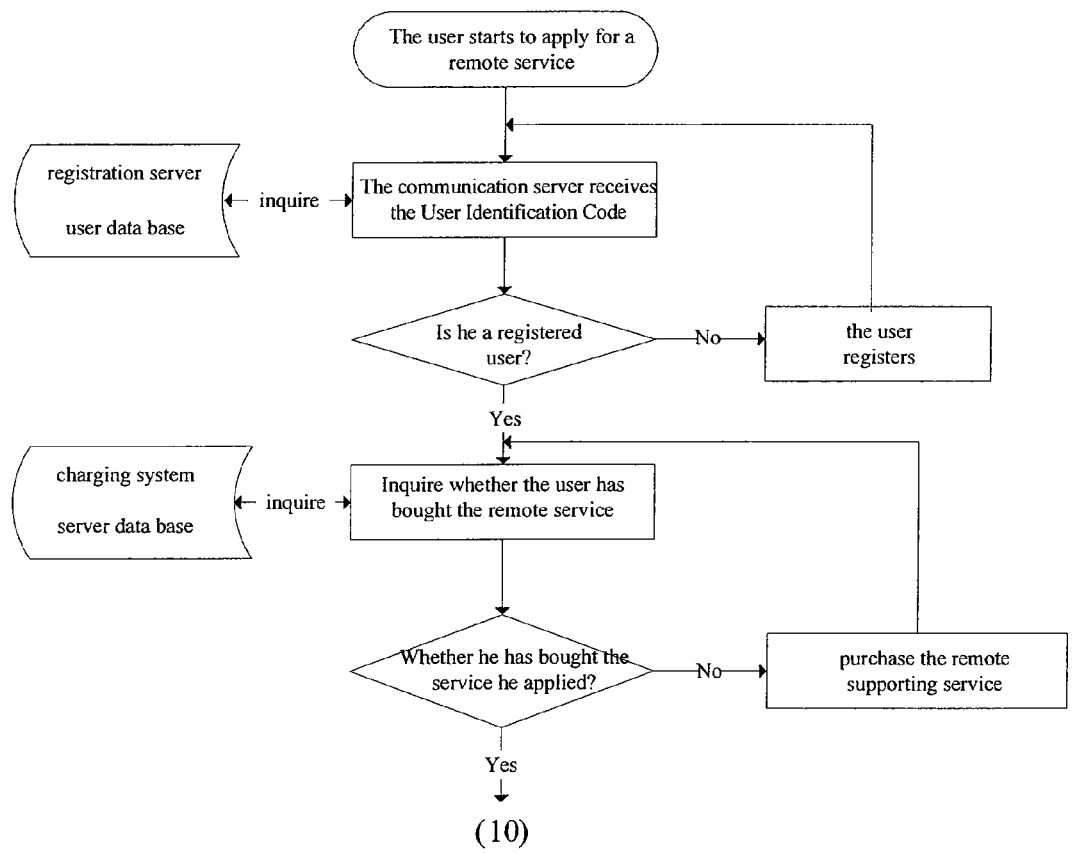
FIG. 1A is the first flow chart of the Realization of the main flow in the present invention.

The technical solution of the present invention is further described as follows:

When the computer user confronts with a computer failure or needs other supporting service, the computer user runs the helped-end agent program (i.e. the above said first agent module) installed on the computer to apply for a remote supporting service. The helped-end agent program is connected to the designated communication server and transmits its own Identification Code to the communication server. The Identification Code mentioned here can be one or one group unique code which is aimed at uniquely identifying the identity of the user or the computer used by the user. The communication server is connected to the registration server to verify the validity of this Identification Code and feedback the result to the helped-end agent program. If the user is not a valid user, the user needs to register, otherwise, the service for the user is directly started.

The authentication procedure for the user also includes identity authentication for the technical supporting staff of the call center. When the helping-end agent program installed on the computer of the call center technical staff logs onto the communication server, the communication server will also authenticate the Identification Code transmitted from the helping-end agent program (i.e. the above said second agent module). If the Identification Code of this helping-end are valid, the connection will be allowed; if it's invalid, the connection will not be allowed so that the technical supporting staff can't provide remote supporting service for the user. The registration of the call center technical supporting staff is also completed by the registration server. During the registration, the registration server will verify whether the registration request of the technical supporting staff is valid or not according to the call center's code provided by the helping-end agent program.

If the Identification Code handed by the helped-end agent program applying for the service are verified to be an unregistered user, the communication server will return the related information of the registration server to the helped-end agent program. The helped-end agent program will guide the user to register on the registration server according to the address information of the registration serve. This procedure can be interactively completed in the way of software or Web. During the registration procedure, true personal information (such as the user name, password, address, phone, Email and other necessary information) may be needed to be provided by the user. This information will be recorded to the data base of the registration server. At the same time, during the registration procedure, the user can choose the corresponding call center, or the system maybe have designated a default call center when it's installed, then, there is no need for the user to choose. The call center mentioned here may be a professional technical supporting service company or a personal. The scale of the call center won't influence the present invention and there won't be any restriction to the present invention. As long as the company and the personal can provide remote service for the computer user, they can both be called as the call center of the present invention.

When the user registration is completed, the registration server will return an Identification Code which can uniquely identify this user to the helped-end agent program. The helped-end agent program is responsible for managing this Identification Code and submits it to the communication server for authenticating the identity of the user during applying for the remote service.

Each technical supporting staff of the call center will commit registration to the registration server by the installed helping-end agent program. During the registration procedure, an personal account number and a unique Identification Code will be established for the technical supporting staff, and at the same time the user feature that it can support will be designated for this call center. The feature mentioned here may be one or one group condition code for corresponding the call center and the computer user. However, such corresponding is not necessarily a unique corresponding, that is to say, one call center can support many kinds of users and one user can also choose different call centers to provide supporting service for himself. The bonding of the call center and the user type may be completed when both registration are completed or may be dynamically completed when the user applies for remote service.

If it can be identified that the helped-end applying for the service is a registered valid user through authenticating by the communication server, the communication server will use the Identification Code of the user to inquire the designated charging system and acquire the service information bought by the user. If the service bought by this user is in the period of validity, transfers to the service authorization phase; if the user has not bought related remote supporting service or the service he bought is already not in the period of validity, it continues to the next step. The service provided by the call center may be free or not be free. Therefore, when the user applies for remote supporting service, the communication server needs to inquire the designated charging system to confirm whether the current user can get the supporting of the call center.

When the communication server discovers that the current user applying for the service has not bought the service or the service has been overdue, it returns the address information of the charging system server to the helped-end agent program. The helped-end agent program guides the user to access the interface of purchasing service. This procedure can be conducted in the way of program or Web even can be conducted in the way of cell phone short message. The specific charging manner is not restricted in the present invention. What the present invention cares about is that when the user needs to pay for the service fee, the helped-end agent program will guide the user to complete the payment procedure. Once the payment is completed, the transaction record of the user' payment will be recorded in the charging system's data base and the user's application for the remote service will be allowed.

When the communication server confirmed the identity of the helped-end user and confirmed that the user has the qualification of applying service, the communication server will allocate a suitable call center for the user applying for the remote service, provide necessary contacting manner, produce service security number, and designate suitable transmission server, wherein following steps are included:

1. Choosing Call Center:

The computer service supporting system may extract the corresponding call center information from the prestored computer user information. Such corresponding relationship is established in the registration procedure, so there is no need to be chosen again; therefore, the choosing procedure mentioned here means that under the circumstance of no definite corresponding relationship, conducting choosing the call center may be compulsive designation, or the user choosing from the list provided by the communication server, or the communication server choosing a matching call center according to some strategy. The strategy mentioned here can include the following situations which are not restricted as follows:

(a) choose a call center according to the area feature where the user is located; for example, the user applies in China that is one type of area feature, and applies in other countries that is another type of area feature; the user may have different area features when it applies in different regions of one same country;

(b) choose a call center according to the time feature when the user applies for the service; for example, working time is one type of time feature and non-working time is a different time feature;

(c) choose a call center according to service type the user applies for; for example, computer data recovering is one type of service type, and computer system recovering is another service type.

Through above procedure, a suitable call center is designated for the current user who applies for the service.

2. Providing the Contacting Manner of the Call Center for the User Who Applies for Service:

After the system of the present invention chooses a suitable call center for the user who applies for service, the communication server needs to returns the call center's contacting manner to the user. Each call center may own many different contacting manners which are even different kinds of contacting manners. It can include the following situations which are not restricted as follows:

(a) it's possible to choose the most suitable contacting manner according to the user's area feature, for example, there is a contacting manner in China and there is another manner in other counties. It is also possible to provide different manners for different regions in the same country.

(b) it's possible to choose the most suitable contacting manner according to the time feature when the user applies for the service, for example, working time is a manner and non-working time is a different manner;

(c) it's possible to choose the most suitable contacting manner according to the service type the user applies for, for example, computer data recovering is a contacting manner, and the computer system recovering is another contacting manner.

The contacting manner mentioned above may include following manners:

(a) that may be a phone number of the calling system of the call center. The user can directly dial this phone number to enter the calling system of the call center.

(b) that may be a VoIP account number. The user can get in touch with the call center only by clicking this account number.

(c) that may also be an account number of the instant message (IM) software. The user can get in touch with the call center by corresponding IM software.

(d) that may also be an IP address. The user can get access to the call center by clicking this IP address.

By above procedure, the contacting manner of the chosen call center is displayed in the helped-end agent program, and the user can get in touch with the call center by using this contacting manner.

3. Designating Suitable Transmission Server:

Because the computer systems of the user who applies for service and the call center technical supporting staff are located in LAN and have no public network IP address, they can't accomplish network communication with each other directly. There is another situation that both sides may be located behind the firewall, and the communication between them can't be accomplished in the normal way. Therefore, in order to overcome the above problems, a server used for transferring must be provided in the public network, and this is the so-called transmission server of the present invention. At the same time, there is a channel agent program in the agent program of each side. This kind of channel agent program can penetrate the firewall to make it possible to directly communicate with the transmission server on the public network. In this way, by making the transmission server as a transmission media, the helped-end and the helping-end both can achieve the communication. Therefore, when the suitable call center is chosen, the communication server will designate a suitable transmission server for the following communication between the helped-end and the helping-end both according to the chosen call center, and the address information of this transmission server will be returned to the helped-end agent program. So-called choosing suitable transmission server can be accomplished according to predefined strategy which can include following situations:

(a) choosing the transmission server designated by the call center according to the call center.

(b) choosing the adhered transmission server according to the helped-end area character.

(c) choosing the adhered transmission server according to the helping-end area character.

(d) dynamically designating an idle transmission server or a transmission server without very heavy load according to the loading situation of the transmission server.

4. Producing Service ID:

Before the remote service is conducted formally, the system also needs to automatically produce a service ID (ID) for this supporting service according to the strategy. This service ID is at the same time corresponding to the address of the chosen transmission server. When the call center technical supporting staff enters this service ID into the helping-end agent program, the helping-end agent program can inquire the address information of the transmission server designated by the system only by using this service ID, and the helped-end and the helping-end both can establish two-way communication by a same transmission server and realize interconnection.

The service ID may be produced by the communication server according to the strategy. It can be a fixed ID bonded with current user who applies for service or a unique ID dynamically produced by system.

After the service ID is produced, it can be transmitted to the user by transmission server so that the user gets the contacting manner of the call center, the current service ID and the transmission server's address information of the user's remote service. The user contacts with the call center according to the contacting manner of the call center and submits this service ID to the technical supporting staff.

Alternatively, after the service ID is produced, it's transmitted to the call center by the communication server so that the user gets the contacting manner of the call center. When the user contacts with the call center according to the contacting manner of the call center, the technical supporting staff will inform the user of this service ID. The user enters the acquired service ID into the helped-end agent program. The helped-end agent program can inquire and get the address information of the transmission server designated by the system only by using this service ID, then the helped-end and the helping-end both can establish two-way communication by a same transmission server.

Alternatively, after the service ID is produced, at the same time, it's transmitted to the call center and the user by the communication server. The user can directly enter the acquired service ID into the helped-end agent program to inquire and get the address information of the transmission server designated by the system, then the helped-end and the helping-end both can establish two-way communication by a same transmission server.

As shown in FIG. 1A, in one embodiment of the present invention, an agent program called helped-end agent program (the first agent module) is needed to be installed in the computer system firstly. When the user needs to apply for remote service, this helped-end agent program is initiated by the user. The helped-end agent program can be installed in the BIOS and/or EFI of the computer; it can be installed in the main operation system of the computer and can also be installed in an assistant operation system; it can be stored in the peripheral devices of said computer, such as CD and USB devices, and can be loaded in the memory after being initiated by said computer; or it can be stored in the website of the Internet, the software with the function of said first agent module is provided by the website, and the computer loads this software to local for execution. The aim of adopting several ways of operations is to ensure that when the main operation system of user's computer can't work, the computer can also be initiated by the agent program installed in the assistant operation system or peripheral devices and can be connected to the Internet so as to carry out following said remote service.

Figure 2:
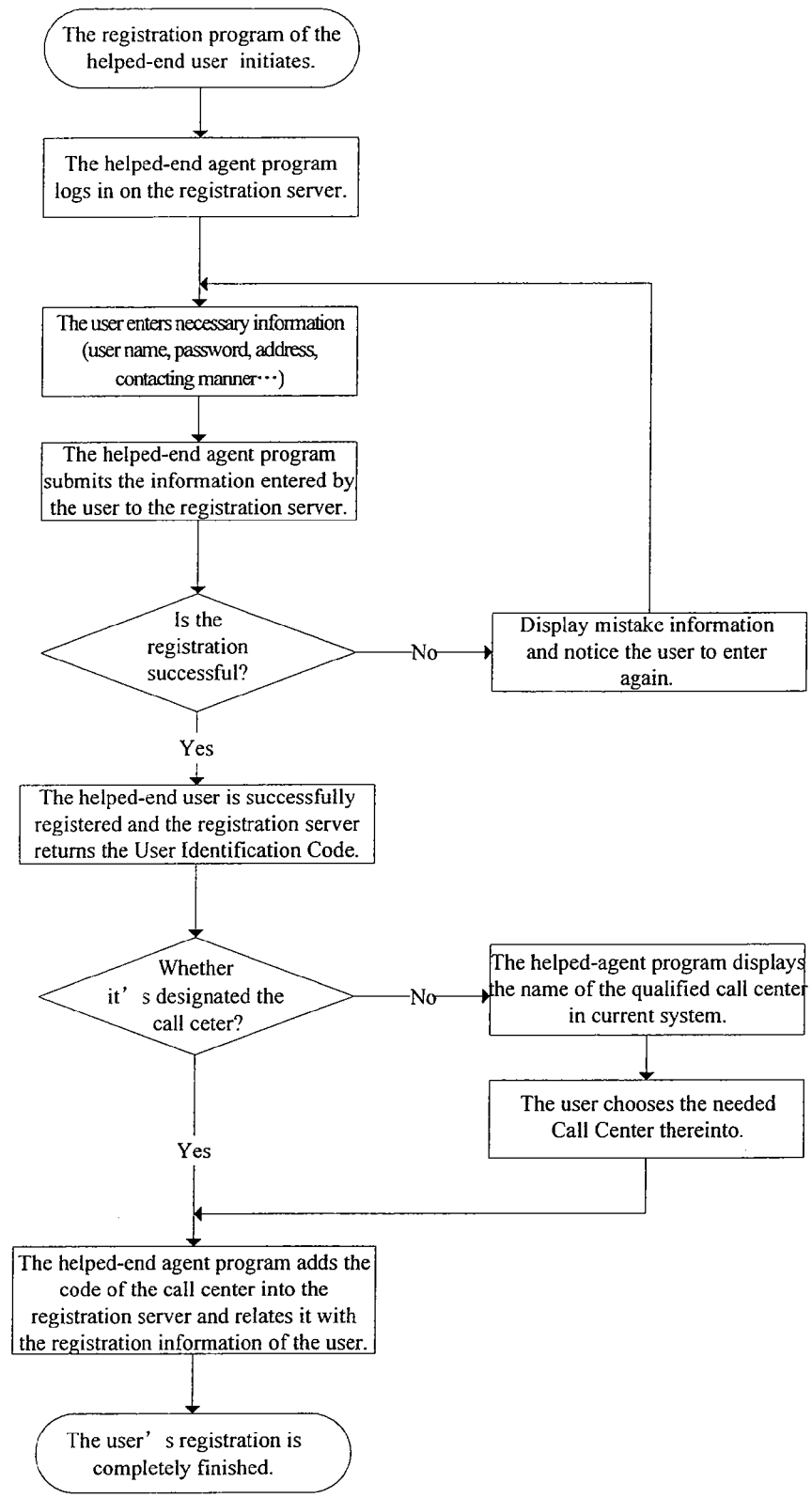
FIG. 2 is the flow chart of user registration in the present invention.
Figure 3:
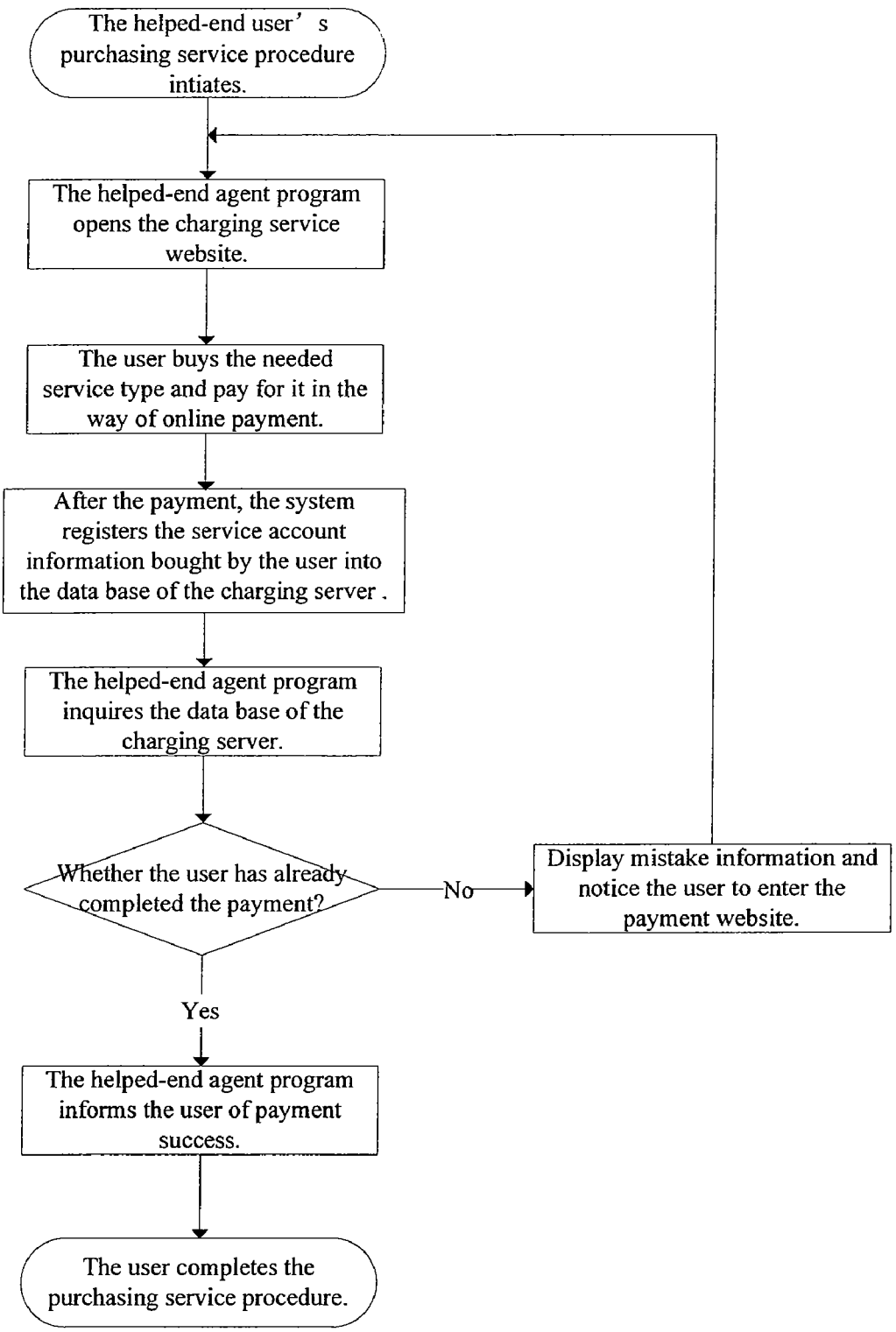
FIG. 3 is the flow chart of the user purchasing service in the present invention.

When the helped-end agent program is initiated, this helped-end agent program is connected to the communication server located in the Internet firstly. After successful connection, the helped-end agent program will examine that whether there is the user's Identification Code stored in this computer. If it has been stored, the user's Identification Code stored is directly sent to the communication server; if it's not stored in this computer, it's necessary for the user to enter the corresponding user's Identification Code. In this embodiment, co-called user's Identification Code refers to a group of user name and password used for uniquely defining the user's identity. The communication server verifies whether this user is a registered user by inquiring the user data base of the registration server. If the user has not been registered, continues to the user registration procedure (as shown in FIG. 2). If the user has been registered, a determination is made whether the user has bought the remote service by inquiring the data base of the charging system server. If the corresponding remote service has not been bought, the user is guided into the website of purchasing service (as shown in FIG. 3). If the user has bought the corresponding service, a suitable call center is allocated for the user so that the call center can provide remote service for the user.

See also FIG. 2, when the user is determined as a registered user by the communication server, the helped-end agent program will initiate the user registration procedure. This procedure requires that the user should establish a unique user name and set a reliable password. And at the same time the user is required to provide address information where he is located and the contacting manner (such as phone, Email and so on). Only after these information recognized by the registration server, will the registration server returns the success mark. Then, the registration server will determine whether the helped-end agent program comprises the given call center code. If the helped-end agent program has already comprised the given call center code, this demonstrates that helped-end agent program installed by this user has already been designated a call center so that write this call center code into the user's registration record. If the helped-end agent program didn't comprise any valid call center code, the helped-end agent program will inquire all qualified call center information in the registration server and display it on user's screen for user to choose. After the user's choosing, the registration server writes the call center code chosen by the user into the field related to the user's registration information. In addition, it should be noted that the present invention doesn't intend to compel the user to designate a call center during registration. The system can also temporarily choose a suitable call center to provide remote service for the user, during the application for remote service.

See also FIG. 3, when the communication server inquires and confirms that the user who applies for service hasn't bought the applied service or the service has already been overdue, the helped-end agent program opens the charging service website, the user enters his own user name and password, and at the same time chooses the type of the needed service and then clicks the confirmation button to pay. The user mentioned in this embodiment may be a wideband user, and the payment can be collected by the substitution charging system of wideband operator. When the user completes the payment procedure, the system will write the service type which is bought and service deadline into the data base of the charging system. The helped-end agent program can determine whether the user has already completed the payment procedure by inquiring the data base of the charging system server.

Figure 1B:
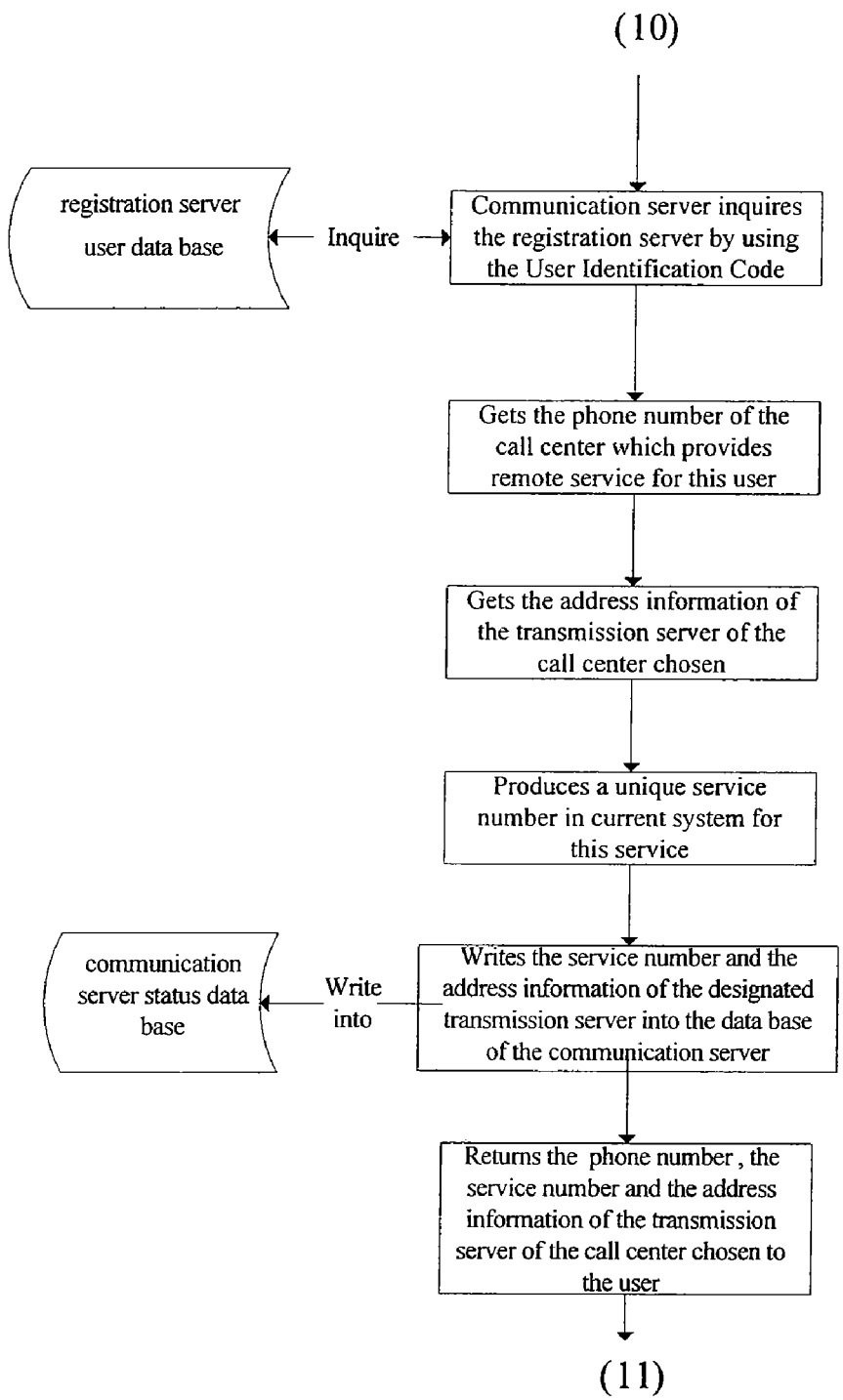
FIG. 1B is the second flow chart of the Realization of the main flow in the present invention.

See also FIG. 1B, when the user has completed the registration procedure and the purchasing service procedure, it continues to the service authorization procedure. The communication server cognizes that the user has been bonded to the call center code by inquiring the user data base of the registration server and chooses the branch of the call center of the area where the user is located to substitute the user for carrying out remote service according to the user's location (such as the information of city, district and so on). The description in this embodiment is to get in touch with the call center by user dialing the designated phone number. Therefore, when the communication server extracts the client supporting calling phone number of the call center located in the user's location from the data base of the registration server according to the call center code designated by the user, at the same time, it also designate the transmission server address used during the formal service. The transmission server mentioned in the present embodiment can be distributed in the IDC (Internet Data Center) of different area in different call center and can provide data transmission service for the call center branch in different district. Additionally, the communication server will produce a unique service ID in current system at the same time. The communication server stores the user Identification Code, transmission server address and the service ID produced in the status data base of the communication server. Then it returns the call center phone number, service ID and the address information of the transmission server which has been chosen to the helped-end agent program. The helped-end agent program displays the phone number and service ID of the call center on the computer screen and notices the user to dial the call center according to this number, at the same time it informs the user to inform the technical supporting staff of the service ID after getting through to the call center.

Figure 1C:
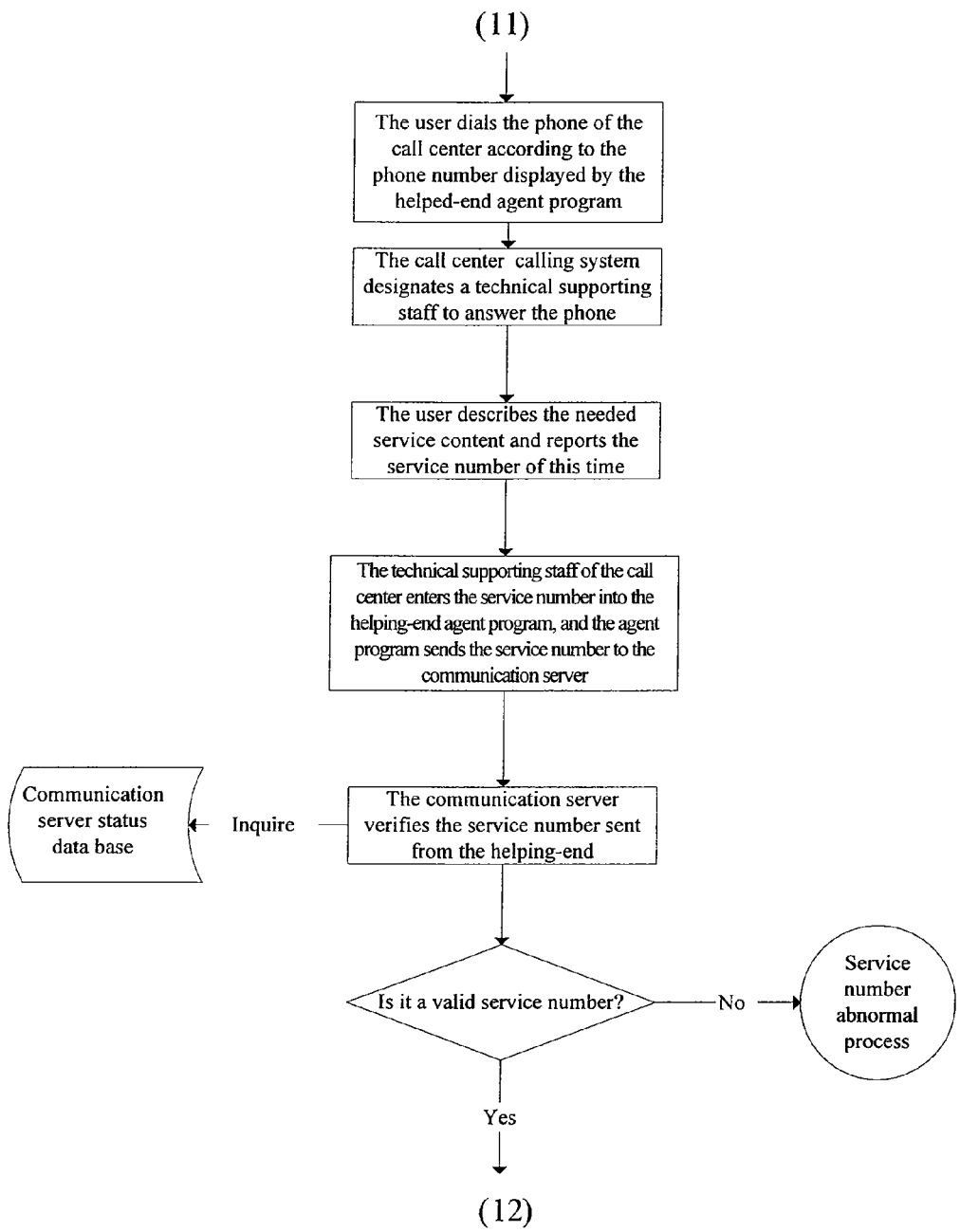
FIG. 1C is the third flow chart of the Realization of the main flow in the present invention.

See also FIG. 1C, after the user got the calling phone number of the call center, it can be started to use phone to dial this number. The call center receives the user's calling by using the existing phone calling system (such as PBX (Private Branch Exchange)/ADC (Automatic Calls Distributor)/IVR (Interactive Voice Response)/VoIP (Voice over IP) . . . ) and transfers it to a technical supporting staff under available status by the function of the phone calling system. At present, the technical supporting staff carries out necessary communication with the user through the phone. He can require the user to describe about the service applied simply and necessarily by asking the user to report the service ID displayed on the computer screen. After gets this service ID, the technical supporting staff will input the service ID into the helping-end agent program. The helping-end agent program reports this service ID to the communication server. The communication server can inquire the status data base in the communication server by using this service ID so as to check whether the service ID is valid. If the service ID is invalid, that is to say there isn't the same service ID record in the status data base, this demonstrates that the user who applies for service is an invalid user. The call center technical staff will deal with it in another way, such as directly refuse the service, or inform the user how to apply for a service. When the communication server has checked the service ID and confirmed it's under valid status, it continues to the next procedure.

Figure 1D:
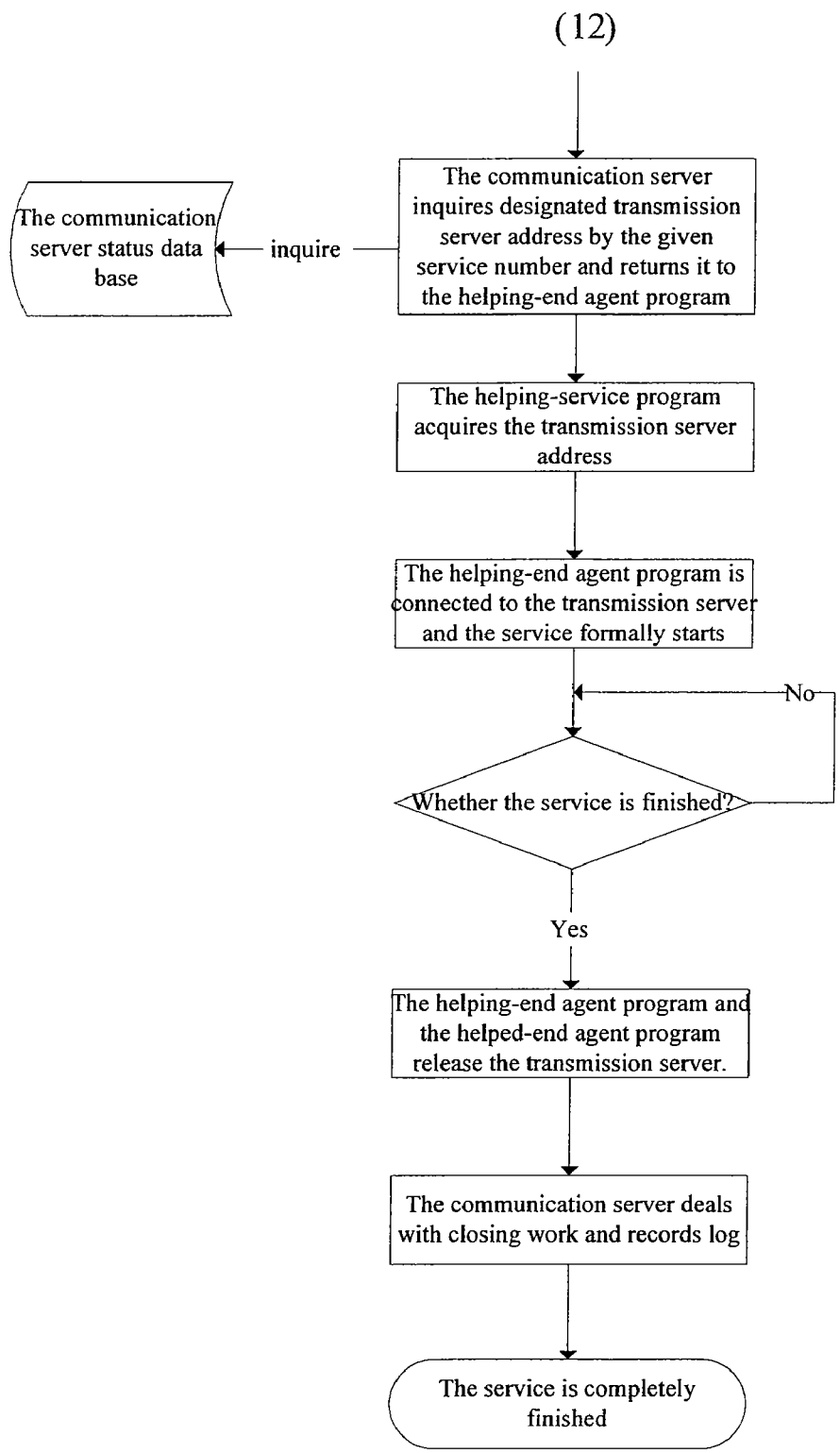
FIG. 1D is the fourth flow chart of the Realization of the main flow in the present invention.

See also FIG. 1D, when communication server has checked that the service ID is success for technical supporting staff of the call center, the communication server retrieves the transmission server address corresponding to the service ID from the status data base and return it to the helping-end agent program. Then, the remote service formally starts and the communication of the helped-end and the helping-end both are also automatically switched to the transmission server.

In the remote service procedure, the helping-end agent program may require the helped-end agent program to collect the asset information of the user computer, such as the hardware configuration information, software configuration information, and other information which can be used for failure diagnosis. The helped-end agent program collects the information, completes some diagnosis operation according to the requirement designated by the technical supporting staff, and finally sends the diagnosis result to the helping-end agent program by the transmission server according to the XML (Extensible Markup Language) file format. The call center technical supporting staff can analyze and get the reason of the failure confronted by the user computer by inquiring the user computer asset information and the diagnosis report of the designated project, and send the designated repair instruction to the helped-end agent program by the helping-end agent program. The use computer will receive the repair instruction of the helping-end by the helped-end agent program and execute the corresponding repair function so as to make the user computer recover to the healthy status. These repair functions cover various repair including operation system, software, user configuration and user data. In a word, any software-nature failure can be recovered by this method. The hardware failure can be diagnosed by the failure diagnosis module in the helped-end agent program. Once it's found to be a hardware failure, the call center technical supporting staff will inform the user of the failure analysis result in the way of phone or text chat, and ask the user for the detailed address then appoint to provide door-to-door repair service. According to statistics, 80% of the computer failures confronted by users are all software-nature failures which can be remotely solved by the system of the present invention. The 20% of the hardware failures can be solved by the service of switching the hardware on the spot.

When the system of the present invention is used to remotely solve the computer failure for the user, in order to achieve a better diagnosis and a better repair effect, the present system also supports text and voice chat for real-time communication with users so as to ensure the correctness of the diagnosis result and ensure that the way of solving problems and the effect of solving problems can be recognized by the user. At the same time, in certain circumstance, for some more complicated problems or some non-failure-nature problems, such as the problems of teaching the user how to configure the E-mail and all that, they can be operated by controlling the desktop of the user's computer. In addition, the system related in the present invention also supports the two-way or one-way video transmission with users, the helped-end and the helping-end both can see each other through the video image, and at the same time can be dubbed together with voice, this makes the remote service more vivid and lively so that the effect is similar to face-to-face communication and service.

The system related in the present invention also comprises some key technical feature that the agent program of the helped-end and the helping-end both comprise an agent module called channel. By the agent function of this module, all the communication can be transferred to the port 80 of the computer operation system to be completed. However, the port 80 of the computer is used for HTTP protocol transmission, i.e. the port supported by Web browser as we calling. This port normally can't be blocked by the firewall so that, both the communications of the helped-end and the helping-end both can penetrate restrict of the firewall restriction, and by taking advantage of the transferring function of the transmission server, two computers located in LAN can accomplish communication.

In a word, the system related in the present invention has following features:

By the channel technique, the communication of the helped-end and the helping-end both won't be disturbed by the firewall blocking so that won't be influenced by the configuration of the system environment when the system is running;

By the transferring of the transmission server, the helped-end and the helping-end both can be located in any environment in the network and it's not needed for the helped-end and the helping-end both to own independent IP address on the Internet.

The remote service mentioned above will last until one side terminates the service. After that, the transmission server is released by both sides. At the same time, the communication server takes over the communication and terminates the communication of both sides. And at the same time the operation log is recorded in the log of the helped-end and the helping-end both so as to be examined in the future. So far, the service is completely finished.

The present invention can also further provide charging function, i.e. after the call center completes the service for said computer, it sends a service ending message to said computer service supporting system, and said computer service supporting system carries out charging for this service according to stipulated charging standard data.

In one embodiment of the system related in the present invention, in order to manage and configure the call center and the technical supporting staff better, a module called call center administrator controlling platform is needed. By this module, the administrator of the call center can register each key information of the call center to the registration server and create the information of the service type, user calling phone, and login account of technical supporting staff etc on the registration server.

Figure 4:
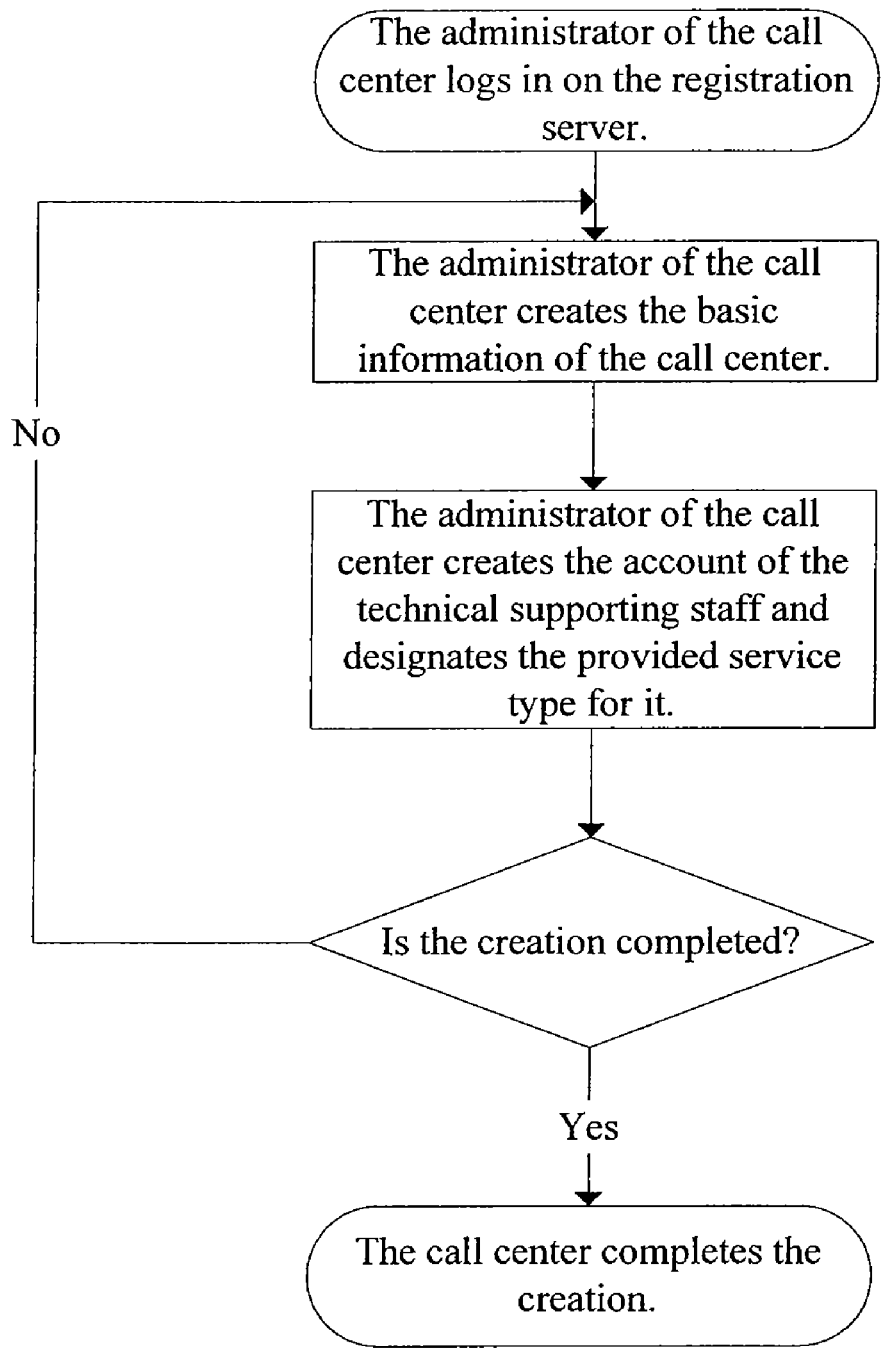
FIG. 4 is the flow chart of creating the basic information of the call center and the account information of the technical supporting staff.

As shown in FIG. 4, the call center administrator logs in to the administration Web page of the registration server by using the administration account of the call center. If it's the first login, what's needed to be established is the information of call center. The call center administrator needs the name of call center, service type provided, and the user's calling number (in the present embodiment, it refers to the phone number) given by each kind of service. At the same time, the IP address of the transmission server and the information of the communication port are also needed to be designated. The so-called transmission server mentioned here can be distributed in IDC (Internet Data Center) of different districts and can also be put in the machine room of the call center. It's required that the transmission server must have an independent Internet IP address which can be accessed by any one of the computer connected to the Internet. If one call center sets branches in each districts, one or more transmission servers can be set in each branches so as to have better communication rate in the assistant procedure. At the same time, different user calling numbers can be provided in different branches so as to shorten the calling distance and lower the calling cost.

After finishing the configuration for the call center, the call center administrator can create a helping-end agent program login account for every technical supporting staffs. The technical supporting staff logs in on the communication server by using his own account through the helping-end agent program and can provide remote service for the user. In the embodiment related in the present invention, there is no need for the technical supporting staff of the call center to create the account by their own instead that the call center management staff should uniformly create and manage these accounts to ensure the security.

Figure 5:
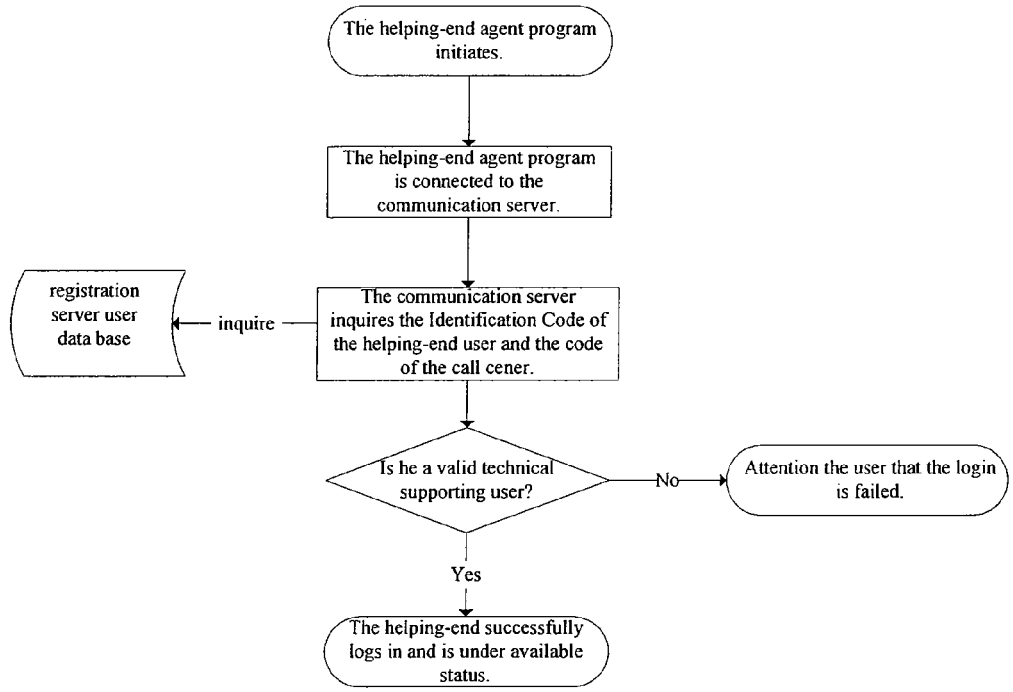
FIG. 5 is the flow chart of the helping end login in the present invention.

As shown in FIG. 5, when the call center technical supporting staff has owned login account, he can enter the login account into the helping-end agent program. The helping-end agent program logs in on the communication server by using this account. The communication server verifies the validity of the user's account by inquiring the call center user account data base of the registration server. If the user is an invalid user, the mistake is shown. If the use is a valid user, login success is returns. After this, agent program of the helping-end is under work-available status.

Figure 6:
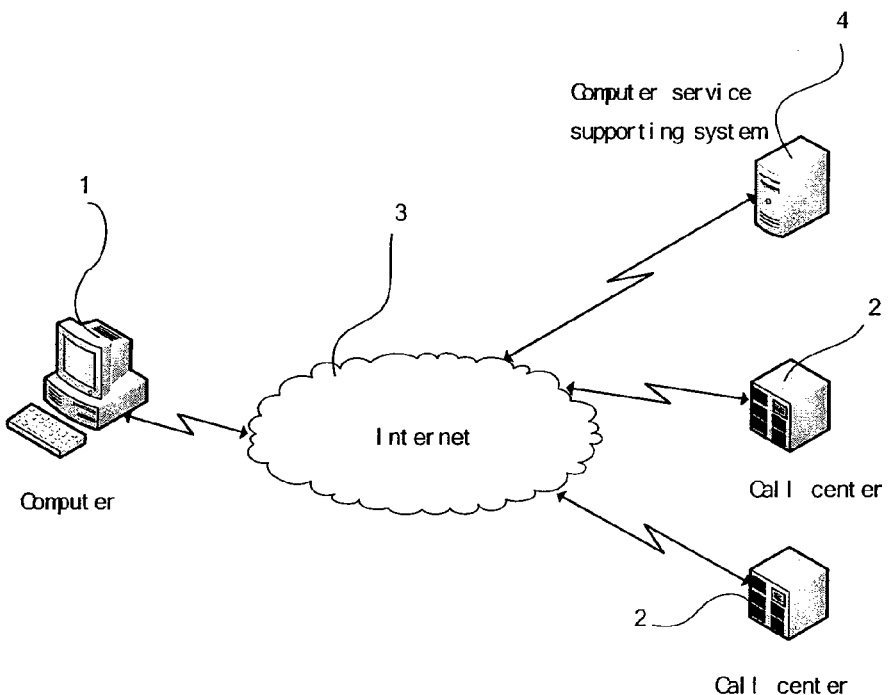
FIG. 6 is the structure sketch of the system of one embodiment in the present invention.

See also FIG. 6, the system of the present invention consists of a computer 1, a call center 2, the Internet 3 and a computer service supporting system 4. The computer 1, the call center 2 and the computer service supporting system 4 are connected and interacted through the Internet 3. The computer service supporting system 4 receives the service request of the computer 1 and allocates and/or designates corresponding call center 2 for said computer 1.

A first agent module 11 (not shown in figures) is set in said computer for logging in on the computer service supporting system 4 through the Internet 3, communicating with the call center 2 designated by the computer service supporting system 4, and sending the needed information to the call center 2 designated by said computer service supporting system 4, or for acquiring instructions or information from the call center 2 designated by said computer service supporting system 4 and completing the service for said computer 1.

A second agent module 21 (not shown in figures) is set in said call center 2, according to the designating of said computer service supporting system 4, for communicating with the first agent module 11 in said computer 1, and receiving the information sent by the first agent module 11, or for sending instructions information to the first agent module 11 and completing the service for said computer 1.

Said computer service supporting system 4 at least consists of a communication server (not shown in figures) and a transmission server (not shown in figures) which are interconnected with each other.

Said communication server is used for receiving the service request sent by the first agent module 11 of said computer 1 and allocating and/or designating a transmission server for interacting for the computer 1 which applies for the service.

Said transmission server is used for receiving the instructions or information of said computer 1 and transmitting them to said second agent module 21, and/or for transmitting the instructions or information sent by said second agent module 21 to said computer 1.

In order to support registration function and better conduct user management, said computer service supporting system 4 further comprises registration server (not shown in figures), in which said computer user information is stored. The registration server is connected to the communication server. Said communication server conducts identification to computer 1 which logs in on the computer service supporting system according to said user information, and feeds the identification result back to said computer 1.

In order to manage call center 2, said registration server further stores the information of call center. Said communication server conducts identification to the call center 2 which logs in on the computer service supporting system according to said call center information, and feeds the identification result back to said call center 2.

In consideration of the possible charging problem of the remote computer service, said computer service supporting system further comprises a charging server (not shown in figures). The charging server is connected to the communication server for charging the computer user who accepts the service according to the service information transmitted by the communication server.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A system of remote computer service comprising a call center and a computer which is connected and interacted with the call center through the Internet, said system of remote computer service further comprises a computer service supporting system, which comprises a communication server and a transmission server which are interconnected with each other, said communication server is used for receiving a service request sent by a first agent module of said computer, allocating or designating a corresponding call center and a transmission server for interacting for said computer, producing a service ID corresponding to an address of the transmission server, and returning communication method information and the service ID of the call center which has been allocated or designated to said first agent module; and said transmission server is used for receiving the instructions or information of said computer and transmitting them to said second agent module, or for transmitting the instructions or information sent by said second agent module to said computer;

a first agent module is set in said computer for logging in on the computer service supporting system through the Internet, accepting the communication method information and the service ID of the call center which has been allocated or designated, communicating with the call center designated by the computer service supporting system through the transmission server corresponding to the service ID, and sending needed information to the call center designated by said computer service supporting system, or acquiring the instructions or information from the call center designated by said computer service supporting system and completing the service for said computer; and a second agent module is set in said call center, according to the designating of said computer service supporting system, for acquiring the address of the transmission server corresponding to the service ID from the communication server, communicating with the first agent module of said computer through the transmission server, receiving the information sent by the first agent module, or for sending instructions or information to the first agent module and completing the service for said computer.

2. The system as claimed in claim 1, wherein said computer service supporting system further comprises a registration server in which said computer user information is stored; the registration server is connected to the communication server; and said communication server conducts identification to the computer which logs in on the computer service supporting system according to said user information and feeds the identification result back to said computer.

3. The system as claimed in claim 2, wherein said registration server further stores the call center information; and said communication server conducts identification to the call center which logs in on the computer service supporting system according to said call center information and feeds the identification result back to said call center.

4. The system as claimed in claim 2, wherein said computer service supporting system further comprises a charging server, the charging server is connected to the communication server for charging the computer user who accepts the service according to the service information transmitted by the communication server.

5. The system as claimed in claim 1, wherein said first agent module is set in Basic Input Output System (BIOS) or Extensible Firmware Interface (EFI) of said computer.

6. The system as claimed in claim 1, wherein said computer is provided with a first operation system, and said first agent module is set in said first operation system.

7. The system as claimed in claim 6, wherein said computer is further provided with a second operation system, and said first agent module is set in said second operation system.

8. The system as claimed in claim 1, wherein said first agent module is stored in the peripheral storage device of said computer and is loaded by said computer into the memory thereof, after said computer is started.

9. The system as claimed in claim 1, wherein said first agent module is stored in the website of the Internet, and said computer downloads said first agent module to local for execution.

10. The system as claimed in claim 1, wherein said communication server is further used for inquiring a status data base thereof by using said service ID so as to check whether the service ID is valid.

11. The system as claimed in claim 1, wherein said first agent module and second agent module both comprise a channel agent program, respectively, for penetrating a firewall to make them possible to directly communicate with the transmission server on the public network when said computer and said call center are located in LAN and have no public network IP address.

12. The system as claimed in claim 1, wherein said first agent module comprises a failure diagnosis module, for diagnosing a hardware failure in said computer.

13. A method of remote computer service, wherein it comprises:
step 1: sending a service request by a first agent module of a computer to a communication server in a computer service supporting system through the Internet;
step 2: after receiving said service request by said communication server, allocating or designating a corresponding call center and a transmission server for interacting for said computer, producing a service ID corresponding to an address of the transmission server, and then returning communication method information and the service ID of the call center which has been allocated or designated to said first agent module by the communication server;
step 3: getting in touch with the call center, by the computer, by using the communication method information obtained by the computer and through a phone calling system; and
step 4: acquiring an address of the transmission server corresponding to the service ID from the communication server, communicating with said first agent module through the transmission server and providing the service applied by said computer by said second agent module.

14. The method as claimed in claim 13, wherein step 1 specially comprises:
logging in on said communication server by the first-agent module, and when it's logging in, sending the user information of said computer to said communication server; and
verifying the computer user information sent by the first agent module by said communication server; if the verification is passed, step 2 is executed; otherwise the information that the verification is not past is sent to said computer.

15. The method as claimed in claim 13, wherein allocating or designating a call center by the communication server in said step 2 specifically comprises that: extracting corresponding call center information from prestored computer user information or choosing a suitable call center from the call centers registered in said computer service supporting system according to a stipulated rule by said communication server.

16. The method as claimed in claim 15, wherein said stipulated rule is stipulated according to the service type applied by said computer, or is stipulated according to the time when said computer applies for the service, or is stipulated according to the district where said computer is located.

17. The method as claimed in claim 13, wherein said step 2 specifically comprises that: after producing the service ID corresponding to the address of the transmission server by the communication server, returning the service ID to the call center also.

18. The method as claimed in claim 17, wherein said service ID is a fixed ID prebonded by said computer or a random ID produced by said communication server.

19. The method as claimed in claim 13, wherein returning communication method information and the service ID of the call center in said step 2 specifically comprises that: sending this service ID to said call center by said communication server, and transmitting the service ID to said computer by said call center.

20. The method as claimed in claim 13, wherein said step 3 specifically comprises that: when said computer gets in touch with the call center by using the communication method information the computer got and through the phone calling system, transmitting this service ID to said call center by said first agent module.

21. The method as claimed in claim 20, wherein acquiring the address of the transmission server corresponding to the service ID in said step 4 specifically comprises that: authorizing the validity of the service ID applied by said computer using said service ID through the communication server, by the second agent module, and if the service ID is valid, retrieving the address of the transmission server corresponding to the service ID and returning it to the second agent module by said communication server.

22. The method as claimed in claim 13, wherein said communication method information is produced according to a stipulated rule in step 2, and said stipulated rule is: the service type applied by said computer, or the time when the said computer applies for the service, or the district where said computer is located.

23. The method as claimed in claim 13, wherein said communication method information in the step 2 is a phone number of the call center, or a VoIP number, or a instant communication system number, or a Internet address.

24. The method as claimed in claim 13, wherein between said step 1 and step 2 the method further comprises:
   step 1A: inquiring whether said computer is a registered computer or not by said computer service supporting system; if it is, the step 2 is executed; otherwise sending the registration information to said computer to attention said computer for registration, and after said computer completes the registration, step 2 is executed.

25. The method as claimed in claim 13, wherein after said step 4 the method further comprises:
   step 5: after said call center completes the service for said computer, sending a service ending message to said computer service supporting system, and charging for this service according to stipulated charging standard data.

* * * * *